April 17, 1956  F. J. KENNEDY  2,742,017
AUTOMATIC APPARATUS FOR SIMULTANEOUSLY ENAMELING
INSIDE AND OUTSIDE ELECTRIC CONDUITS
Filed Nov. 9, 1950  3 Sheets-Sheet 1

INVENTOR
Frank J. Kennedy
BY
ATTORNEY

April 17, 1956  F. J. KENNEDY  2,742,017
AUTOMATIC APPARATUS FOR SIMULTANEOUSLY ENAMELING
INSIDE AND OUTSIDE ELECTRIC CONDUITS
Filed Nov. 9, 1950  3 Sheets-Sheet 2
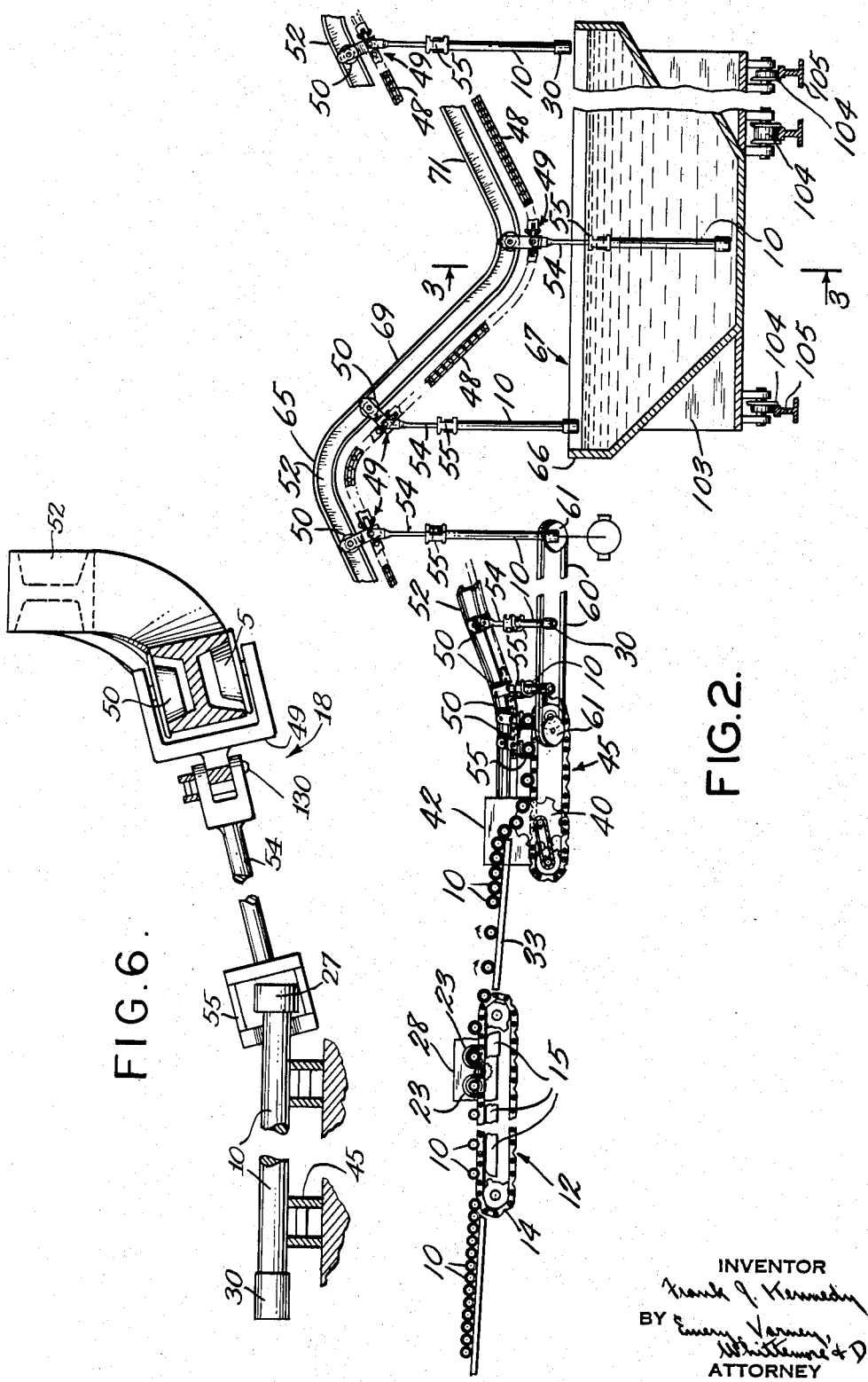
INVENTOR
Frank J. Kennedy
BY
ATTORNEY April 17, 1956  F. J. KENNEDY  2,742,017
AUTOMATIC APPARATUS FOR SIMULTANEOUSLY ENAMELING
INSIDE AND OUTSIDE ELECTRIC CONDUITS
Filed Nov. 9, 1950  3 Sheets-Sheet 3

INVENTOR
Frank J. Kennedy
BY
ATTORNEY

United States Patent Office 2,742,017
Patented Apr. 17, 1956

2,742,017

AUTOMATIC APPARATUS FOR SIMULTANEOUSLY ENAMELING INSIDE AND OUTSIDE ELECTRIC CONDUITS

Frank J. Kennedy, Mount Lebanon, Pa., assignor to National Electric Products Corporation, Pittsburgh, Pa., a corporation of Delaware Application November 9, 1950, Serial No. 194,754

9 Claims. (Cl. 118—9)

This invention relates to apparatus that automatically enamels both the inside and outside surfaces of electric conduits, that dries and bakes the enamel, and that delivers the conduits at an inspection and packing station in a continuous operation.

It is an object of the invention to reduce the expense and the time required for enameling electric conduit, and to insure a uniform product. The economy is effected by reducing to a minimum the amount of handling required. From a stack of conduits delivered to the apparatus by a crane, the invention puts fittings on the conduits, connects them in spaced relation on a conveyor, dips them into a tank of enamel, controls the run-off and drip of the enamel, dries the enamel and bakes it, and then lays the conduit down horizontally on an inspection table, all with little or no attention or intervention by operators.

Another object is to provide automatic enamelling apparatus with a plurality of tanks for holding different kinds of enamel that are to be applied to electric conduit, and with the same conveyor for advancing and dipping the conduits regardless of which of the tanks is chosen for immersion of the conduits.

Other objects, features and advantages of the invention will appear or be pointed out as the description proceeds.

In the drawing, forming a part hereof, in which like reference characters indicate corresponding parts in all the views, Fig. 1 is a diagrammatic plan view of the enamelling apparatus of this invention illustrating more particularly the correlation of the various regions of treatment with the conveyor extending back and forth along a tortuous path to produce a compact apparatus suitable for use in a relatively short building with limited floor space, Fig. 2 is a diagrammatic side elevation, on an enlarged scale, showing the part of the apparatus of Fig. 1 where the conduits are supplied to the apparatus, picked up by the main conveyor, and immersed in the enamel tank.

Figure 6 is an enlarged sectional view showing the way in which the holders engage conduits on the conveyor.

Figure 1:
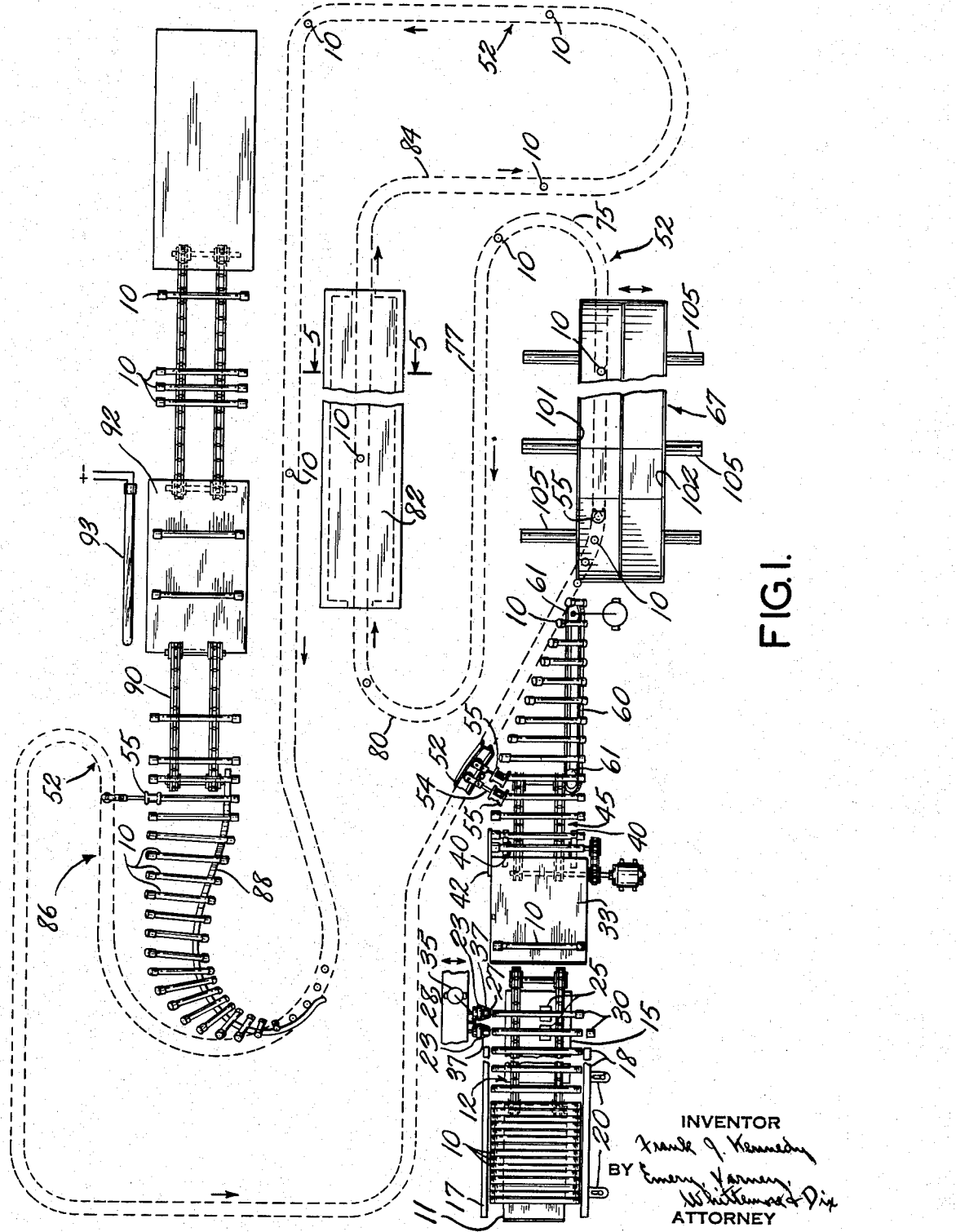

Groups of electric conduits 10 are initially placed on a supply table 11, preferably by a crane. From this supply table the conduits 10 are removed one at a time by a conveyor having endless chains 12 with spaced holders 14 that pick up the successive conduits as the holders 14 pass the stack of conduits at the end of the supply table 11. These conveyor chains move the conduits along a supporting frame 15 having longitudinal surfaces extending parallel to the direction of movement of the top runs of the chains 12.

The conveyor chains 12 move the conduits 10 between gauge plates 17 and 18. One of these plates, preferably the plate 17, is at a fixed location; but the other gauge plate 18 is movable toward and from the plate 17, and can be held in any adjusted position by screws 20 that pass through slots in lugs extending from the back of the gauge plate 18. The spacing between the gauge plates 17 and 18 is adjusted to provide a "go—no go" gauge which rejects any conduit longer than the clearance between the plates 17 and 18.

Beyond the gauge plates 17 and 18, the conveyor chains 12 move the conduits past a plurality of spinning heads 23 and over magnetic chucks 25, illustrated diagrammatically in Fig. 1. The drawing shows only two spinning heads 23 and magnetic chucks 25, but it will be understood that these are merely representative of a plurality of spinning heads and chucks and that there are preferably ten or more spaced from one another along the conveyor chains 12 by exactly the same distance as the spacing of the conduits 10. With this construction, the stopping of the conveyor chains with one conduit 10 in front of one of the spinning heads 23 locates successive conduits in line with the other spinning heads.

As soon as the conveyor chains 12 have moved far enough to bring a fresh supply of electric conduits 10 in front of the spinning heads 23, the electric chucks 25 are energized to hold the conduits against axial displacement, and a frame 28, by which spinning heads 23 are carried, is moved inwardly toward the conveyor chains 12 and the conduits 10. Each of the spinning heads 23 has jaws that hold a coupling which is brought into engagement with the threaded end of a conduit 10 as the frame 28 moves toward the conduits. The rotation of the spinning heads is in a direction to screw the couplings on the threaded ends of the conduits 10.

The electric chucks 25 hold the conduits 10 firmly enough to prevent them from turning while the couplings are initially screwing on the threaded ends of the conduits, but as soon as the couplings are on the threads far enough to make a tight connection, each of the conduits 10 rotates as a unit with its connected coupling until the spinning heads 23 are stopped and their jaws released from the couplings 27. The frame 28 then backs away from the conduits 10, leaving the conduits free to advance with the conveyor chains 12 when the conveyor chains are again set in motion.

While the couplings 27 are being screwed on one end of each of the conduits 10, a thread protector 30 is slipped over the threads at the other end of each conduit. These thread protectors 30 are preferably paperboard tubes which slide over the threads and fit snugly enough to prevent the threads from being coated by enamel in the subsequent immersion operation. These thread protectors 30 require no rotation to apply them and they can be slipped on the tubes either manually or by automatic feed devices.

After the couplings 27 and the thread protectors 30 have been applied to a group of conduits 10, the conveyor chains 12 are operated to advance them for a distance equal to the spacing of ten or more conduits 10 so as to dump on a table 33 all of the conduits to which couplings and thread protectors have been applied. Thus, with 10 spinning heads 23, the conveyor chains 12 are moved a distance equal to the total spacing of ten conduits along the conveyor chains and this movement brings the 11th conduit into the position formerly occupied by the first conduit of the group to which couplings and thread protectors were applied.

An explanation of the detailed construction of the conveyor chains 12 and the spinning heads 23 is not necessary for a complete understanding of this invention. It is sufficient to understand that all of the spinning heads 23 are power-operated by a motor 35, or other driving means, and that they have releasable jaws 37 in which the couplings 27 are held in axial alignment with the conduits 10 supported on the conveyor chains. In practice, the couplings 27 are supplied automatically to the spinning heads but this is not an essential feature of the invention.

The intermittent operation of the conveyor chains 12 delivers a group of conduits to the table 33 each time that the conveyor is operated, for example ten, if the apparatus is equipped with ten spinning heads 23. The table 33 is inclined so that the conduits 10 roll down the incline to dispensing wheels 40 having notches which take successive conduits, one at a time, from the group of conduits on the inclined table 33. There is a gauge plate 42 beyond one of the dispensing wheels 40 and each of the conduits is preferably positioned axially by pushing it toward the gauge plate 42 until the end of the coupling contacts with the plate. This locates the conduit in the correct position longitudinally for subsequent pick-up by the conveyor.

Each conduit is carried by the dispensing wheels through a short arc of travel of the wheels and is lifted out of the notches of the dispensing wheels as they travel beyond the top of an endless chain conveyor 45. Like the conveyor with the chains 12, the conveyor 45 has two chains which are located near the opposite ends of the conduits and in position to hold the conduits substantially horizontal as they are advanced beyond the dispensing wheels 40.

The main conveyor of the apparatus comprises an endless chain 48 made up of carriage or carriage sections 49 which have rollers 50 that travel along an endless track 52. The construction of this conveyor will be explained more fully in connection with Fig. 4, and for the present it is sufficient to understand that the carriage sections are pivotally or flexibly connected together to make the chain 48 and that there is a rod 54 extending downward from each of the conveyor sections 49, and that there is a holder 55 secured to the lower end of each of the rods 54. This holder 55 is a hollow frame open at the front end for receiving the coupling 27; and the sides of the hollow frame extend toward one another at their lower ends so as to provide shoulders which fit under the bottom face of the coupling. The conduits are supported by these inward extensions of the side wall which extend under the couplings and provide surfaces on which the ends of the coupling rest. This construction is most clearly shown in Figure 5.

Figure 6 shows the way in which the holders 55 are brought into position to engage with the ends of conduits on the conveyor 45. The I-beam track 52 has a portion which is warped so as to tilt the carriage sections 49 into a position such as shown in Figure 6. The hanger rod 54 of each carriage is connected with the carriage by a pivot connection which permits the hanger rod to swing in a plane which is in substantial alignment with the web of the I-beam track, but the hanger rod 54 cannot swing transversely of its direction of movement. Tilting of the carriage 49, therefore, tilts the hanger rod 54, as shown in Figure 6, into a position in which the hanger rod extends in a direction having a substantial component. It is not necessary to bring each hanger rod 54 into a completely horizontal position.

When the carriage 49, and hanger rod 54, are tilted by the warp section of the track 52, the lower wheel 50 bears against the upper flange of the I-beam, whereas the upper wheel 50 continues to run on the lower flange of the I-beam with the flange of the wheel against the edge face of the I-beam flange. The hanger rod 54 is long enough to reach a conduit 10 on the conveyor 45. The open forward end of the holder 55 passes over the coupling 27, as shown in Figure 6. The back of the holder 45 is closed so that continued movement of the carriage 49 along the track 52 causes the holder 55 to drag the conduit 10 from the conveyor and to advance it as the carriage advances along the track, and eventually into a vertical position.

There is an endless belt 60 running on wheels 61 that turn on inclined axles. As each conduit 10 has its coupling end raised from the adjacent chain of the conveyor 45, the other end of the conduit 10 is dipped downward into contact with the belt 60 and remains in contact with this belt until the conduit reaches a vertical position. The conveyor 45, conveyor chain 48 and inclined belt 60 are driven at coordinated speeds which give them substantially equal velocity in the direction in which the top runs of the conveyor chains are moving. The purpose of the belt 60 is to restrain the lower ends of the conduits 10 so that they hang quietly without swinging as they approach the vertical position.

The conveyor chain 48 raises each conduit 10 to a high region 65 (Fig. 2) of the track 52 and at this region the lower end of the conduit 10 is high enough to pass over an end wall 66 of tanks 67 which contain enamel. Beyond the high region 66, the track 52 has a steeply descending run 69 along which the conveyor chain travels while it lowers the conduits 10 progressively deeper into the tank.

The tanks 67 are deep enough to permit the conduits 10 to be fully immersed in the enamel so that both the inside and outside surfaces of the conduits are coated with enamel. The threads at the upper end of each conduit are protected from the enamel by the coupling 27, and the threaded protector 30 at the lower end of the conduit keeps the enamel from coating the threads over which the protector 30 is placed. If the inside threads of the coupling beyond the upper end of the conduit are to be protected from enamel, this is done by placing internal thread protectors comprising plugs or paperboard sleeves in the couplings.

From the low point of the track 52 above the tanks 67, the track has an upwardly sloping run 71 along which the conveyor chain moves as it lifts the conduits out of the enamel in the tank. The upward run 71 has a slope which is less steep than the downward run 69. In practice, the downward run 69 is at an angle of approximately 45° to the horizontal, whereas the upward run 71 is at an angle of the order of 25° to the horizontal. These angles are merely illustrative.

One factor is that the run 69 is made as steep as practical considering the construction of the conveyor chain and the angle at which each of the rods 54 can move with respect to the conveyor chain section to which it connects. Another factor is that the upward slope of the track section 71 is preferably coordinated with the viscosity of the enamel and the speed of travel of the conveyor chain so that the conduits are lifted progressively higher in the enamel at the rate at which the enamel runs down the surfaces of the conduit. This has the advantage of leaving each conduit substantially free of excess enamel at the time that the conduit is fully withdrawn from the enamel bath. The term "excess enamel" as used herein, designates enamel which will run down the conduit and drip from the lower end of the conduit as the conveyor chain advances the conduits beyond the enamel tanks. Thus, the elimination of any substantial amount of dripping beyond the tanks effects a substantial economy by preventing waste of enamel.

Referring again to Fig. 1, the track 52 travels around a reverse bend 75 and has a long straight run 77 along which the conveyor chain travels while the enamel dries, or at least becomes tacky or stable so that it is ready for baking. The reverse bend 75 locates the track run 77 substantially parallel with the long dimensions of the enamel tanks 67 so as to conserve space while still obtaining a substantial distance for the conduits to travel allowing time for the enamel to become stabilized.

The track 52 then turns through another reverse bend 80 and extends along a run substantially parallel to the run 77 but within a furnace 82 in which the enamel on the conduit is baked. Since the endless chain travels with continuous motion along the track 52, the length of the furnace 82 and its heating capacity are coordinated with the speed of travel of the conveyor so as to obtain the necessary baking time for each conduit in the furnace 82.

Beyond the discharge end of the furnace 82, the track 52 traverses a tortuous path 84, part of which is substantially parallel with the run 77 and the furnace 82. This path 84 is of a length that is coordinated with the conveyor speed so as to allow the conduits to cool in the air to a low temperature appropriate for handling before the conveyor chain carries the tubes to a delivery region 86.

At this delivery region the track 52 extends downwardly and it brings the lower ends of the conduits into contact with a guide rail 88 which restrains the lower ends of the conduits until the track 52 extends down far enough to lower the conduits into a substantially horizontal position at the upper end of an inclined frame 90. As the conveyor moves downward, its sections are tilted by a warped portion of the track 52, and the holders of the conveyor release the conduits 10.

The conduits, freed from the conveyor, roll down the inclined frame 90 to an inspection table 92. A luminous tube 93 at one side of the inspection table provides a light that shines through the tubes so that an inspector can see the inside surfaces by looking through each tube from the opposite end of the table 92 as the successive tubes come on to the table. Beyond the table 92, the conduits 10 are assembled into bundles for either shipping or storage.

The track 52 passes on beyond the delivery region 86 with a reverse bend and along a course which brings it back to the vicinity of the conveyor 45 where the empty holders of the conveyor chain pick up new lengths of conduit and repeat their cycle.

Figures 3, 4, 5:
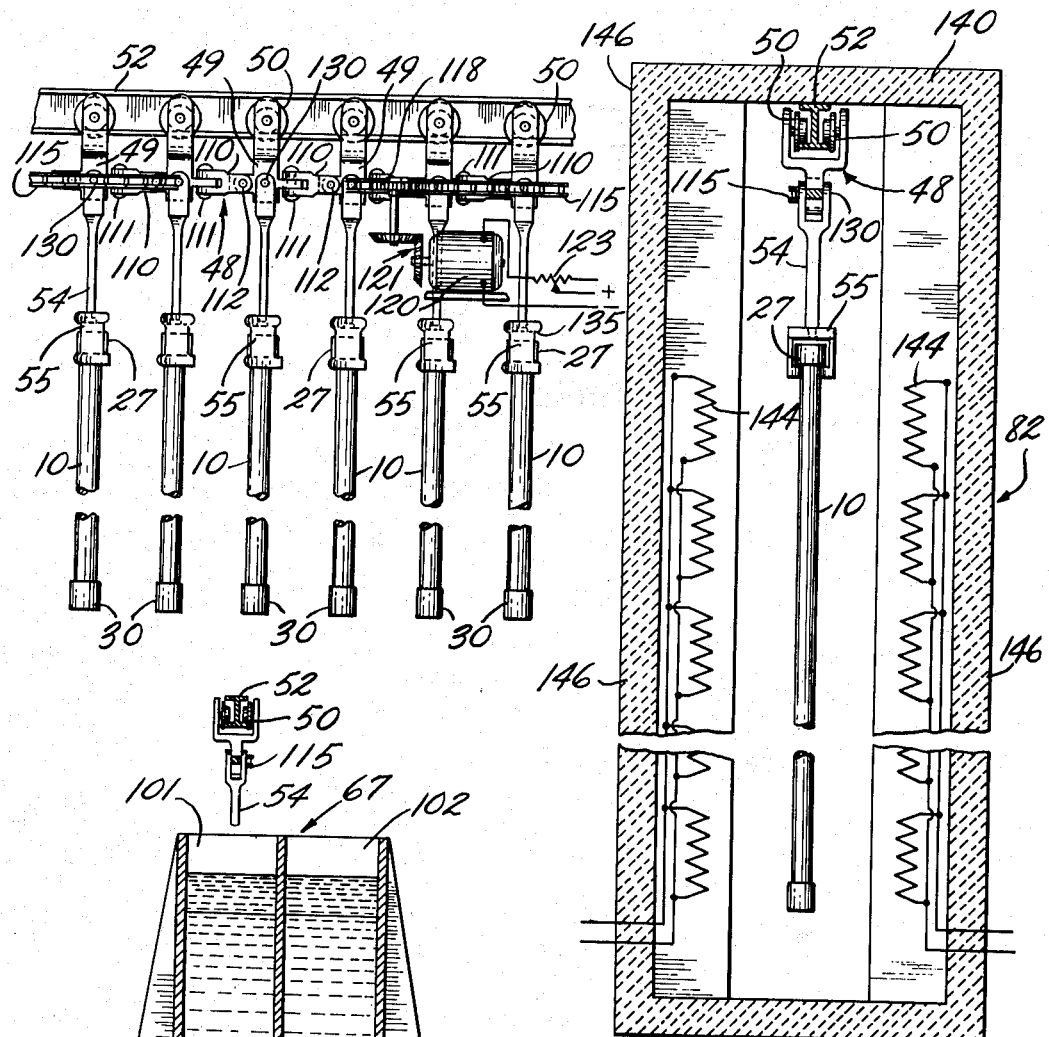
Fig. 3 is a vertical sectional view through the enamel tanks shown in the other figures.
Fig. 4 is a diagrammatical detail view of a portion of the conveyor track and conveyor.
Fig. 5 is an enlarged, vertical sectional view through the furnace in which enamel is baked.

Fig. 3 shows the construction of the tanks 67 which hold the enamel. It is a feature of the invention that there are two tanks 101 and 102 side by side and supported on a common frame 103. The frame is equipped with wheels 104 that run on rails 105. These rails extend transversely of the direction in which the conduits are advanced by the conveyor so that when the frame 103 is in the position shown in Fig. 1, the tank 101 is centered directly under the conveyor track 52 and the conduits hanging from the conveyor chain are immersed in the enamel contained in the tank 101. If it becomes desirable to immerse the conduits in another kind of lacquer, which is contained in the tank 102, the conveyor chain is operated, without allowing it to pick up any additional conduits, until all of the conduits immersed in the tank 102 have been lifted out of the tank. Then the frame 103 is rolled along the rails 105 far enough to bring the tank 102 into position directly under the conveyor track 52. In practice it has been found convenient to have one of the tanks filled with black lacquer, and the other compartment filled with clear lacquer.

Fig. 4 is a diagrammatic illustration of the conveyor chain 48. The conveyor sections 49 are connected together by links 110, and these links are connected at their opposite ends to the conveyor sections by pivot pins 111 and 112. The pins 111 have their axes extending substantially vertically so as to permit the conveyor chain to flex horizontally for traveling around curves in the track 52. The pivot pins 112 have their axes extending horizontally so as to provide the conveyor chain with flexibility for travel along up and down waves in the track. It will be evident that since these pivot pins 111 and 112 are at right angles to one another, they provide universal connections between the sections of the conveyor chain.

It is not essential that the axes be vertical or horizontal, it being sufficient that they are at right angles to one another.

There is a sprocket chain 115 connected with the sections 49 of the conveyor chain and this sprocket chain is made with links having sufficient angular movements to accommodate them to the angular movement of the conveyor chain sections with respect to one another. Power is supplied to the conveyor chain 48 to advance it along the track 52, by driving sprockets 118 located at regions along the track 52. Each of these driving sprockets 118 is driven by a motor 120 through suitable reduction gearing 121. The speed of the conveyor chain is regulated by adjusting a speed control 123 of the motor 120.

Each of the rods 54 is connected to its associated conveyor chain section by a pivot 130 which permits the rod to hang in a vertical position when the conveyor chain is traveling up and down inclines of the track 52. However, the rods 54 have forked ends that extend upon opposite sides of the conveyor sections 49 so that when the conveyor chain encounters a warped section of the track, and the conveyor sections are tilted, the rods 54 are also tilted. The holders 55 at the lower ends of the rods 54 are rigidly connected with the rods so that each holder moves as a unit with its associated rod 54.

Each of the holders 55 has an opening 135 at the front of the holder somewhat larger than the coupling 27 on the conduit 10. The bottom of the holder 55 has a slot in line with the opening 135 but of a width slightly greater than the diameter of the conduit 10 and less than the diameter of the coupling 27. The coupling 27, therefore, serves as a collar by which the conduits 10 are picked up by the holders 55. The entrances into the holders are preferably flared so that they need be brought into only an approximate alignment with the conduits in order to hook over the couplings at the ends of the conduits in the manner already described.

Fig. 5 shows the furnace 82 with a roof 140 that supports the track 52. Heaters 144 are supported from the inside of furnace walls 146. These heaters are shown as electric resistance heaters, but it will be understood that the furnace may be heated in any way which does not produce an atmosphere injurious to the enamel. The conveyor chain 48 travels along the track 52 with continuous motion as it advances the successive lengths of conduit between the banks of heaters 144 to bake the enamel.

It is important that the heating be sufficient to raise the metal of the tube to a high enough temperature to bake the enamel on the inside surface of the conduit. This makes a long furnace more advantageous because it is necessary to allow time for heat to soak into the metal to the inside enamel. Any heating intense enough to heat the inside enamel very quickly would be so intense that it would damage the coating on the outside of the conduits.

The preferred embodiment of the invention has been illustrated and described, but changes and modifications can be made and some features of the invention can be used alone in different combinations without departing from the invention as defined in the claims.

I claim as my invention:

1. Electric conduit enameling apparatus comprising a chain conveyor including a train of connected carriage sections and a track along which the carriage sections travel, a part of the length of the track extending above and along the length of an enamel tank, of the chain conveyor, hangers at spaced regions along the length of said chain conveyor and connected thereto for holding one end of a conduit that is to be enameled, a second conveyor with means to hold a group of substantially horizontally disposed conduits and that advances the conduits with the conduits extending horizontally, said second conveyor and the chain conveyor converging toward one another in the direction of movement of the chain conveyor and at a region near the end of the second conveyor and with such coordination that the hangers of the chain conveyor engage the ends of the electric conduits on the second conveyor and shift them into substantially vertical positions, said chain conveyor having a downwardly extending section above the tank for immersing successive conduits in the tank, and having an upwardly extending section for withdrawing the successive conduits from the enamel.

2. Apparatus for enameling electric conduits including a conveyor chain comprising successive carriage sections and connectors flexibly connecting the carriage sections together in a train, supporting means along which the conveyor chain runs, hangers at spaced regions along the conveyor chain for supporting electric conduits that are to be enameled, a run of the conveyor chain and its supporting means extending above and along the length of a tank for enamel, said tank being located directly under the conduits carried by the hangers, the supporting means along which the conveyor chain runs having a depressed portion above the tank along which the conveyor chain moves downward and then upward through a displacement sufficient to immerse each conduit in the tank and then withdraw it from the tank by the time the conveyor chain has moved each hanger beyond the end of the tank, a pickup station at which lengths of conduit are disposed horizontally with respect to one another and at which they are engaged by the successive hangers of the conveyor chain for lifting the conduits at one end and shifting them into a substantially vertical position for immersion in the tank, mechanism for feeding the successive lengths of conduit to the pickup station, said mechanism including a gauge plate in position to contact the ends of the successive conduits to establish them in proper axial position for engagement by the hangers at the pickup station.

3. Apparatus for enameling successive lengths of electric conduits including an inclined frame along which the conduits roll as they are supplied to the apparatus, a gauge plate that positions the successive lengths of conduit axially of their length, a conveyor that takes the conduits from a region at the lower end of the sloping frame and that advances them horizontally in spaced relation and toward a pickup station at which conduit hangers pick up the tubes at one end, and an overhead conveyor chain to which the hangers are connected, said conveyor chain being movable along an overhead support that has a portion with a long depression therein, the depressed portion of the overhead support along which the chain moves extending above and along the length of a tank that holds enamel into which the conduits are to be dipped.

4. Apparatus for automatically handling and dipping electric conduits into a tank of enamel, said apparatus comprising a station at which a protecting coupling is attached to one end of each conduit, a sloping frame on which each successive conduit is discharged from the coupling-attaching station and along which the conduit moves in a generally horizontal position, a conveyor at the lower end of the sloping frame including a device that takes one conduit at a time and delivers it to a belt conveyor, an overhead conveyor with hangers located at spaced regions along its length, conveyor supporting means that guide the hangers of the overhead conveyor into position to engage the ends of the conduit, on which the protecting couplings have been placed, to pick up the conduits by the couplings and move said conduits into substantially vertical positions, said conveyor supporting means having a portion that dips downward toward a tank over and along the length of which the overhead conveyor extends, said conveyor supporting means having an immediately succeeding portion that extends upward again away from the tank, the portions of the conveyor supporting means that extend downward and then upward being located in positions for causing the conduits supported by the hangers to be immersed into the enamel located in the tank and then withdrawn during the travel of each conduit along the length of the conveyor supporting means above the tank.

5. Enameling apparatus that dips electric conduits into a tank that holds liquid enamel, said apparatus including a conveyor chain with hangers at spaced regions along its length for supporting successive conduits in substantially vertical positions, a support along which the conveyor chain moves, said support having a portion of its length located above the tank with a run that extends first downwardly toward the tank and then upwardly away from the tank, the lowest part of the conveyor support being in such position that a conduit carried by one of the hangers of the conveyor chain is completely immersed in enamel in the tank when the hanger reaches the lowermost region of the conveyor support, a furnace for baking the enamel, said conveyor support having another portion that passes through the furnace, a long run of the conveyor support beyond the furnace and along which the hangers advance the conduits while the conduits are cooled by contact with the air, guide means located along the path of the conduits in position to tilt the conduits into substantially horizontal positions as said conduits travel along the guide means, and an inspection table located at another portion of the conveyor support beyond said guide means and at which the hangers discharge the conduits.

6. Apparatus for coating the interior and exterior surfaces of electric conduits including, in combination, a continuous conveyor chain having successive sections joined by connections that give both horizontal and vertical pivotal movement of the successive sections with respect to one another for traversing curve and warped sections of the track, said track having a downwardly sloping and warped portion that tilts the conveyor chain into position to engage the ends of electric conduits at a pickup station, and said track beyond the warped portion having an upwardly extending section beyond the pickup station and along which the conveyor chain moves to raise conduits into substantially vertical positions, the track then extending lengthwise along and above a tank containing liquid into which the conduits are to be immersed, the portion of the track above the tank having a run extending downwardly at a steep angle for immersing the conduits in the liquid and having a successive run extending upward at a more gradual slope for causing the conveyor chain to raise the conduits from the tank gradually, the track beyond the tank extending for a substantial distance along which the conveyor chain travels while any excess liquid remaining on the conduits drips off, the track then extending through a heating region at which the coating on the pipe is subjected to high temperature, another portion of the track located beyond the heating region and of sufficient length to provide time for the conduits to cool while the conveyor chain travels along the portion of the track beyond the heating region, a second warped section of the track extending downwardly at a delivery station where the conveyor chain lays the conduits progressively into horizontally extending positions and disengages from the conduits, and a connecting section of track along which the conveyor chain travels from the delivery station at which the conduits are disengaged from the conveyor chain to the pickup station at which new conduits are picked up by the conveyor chain.

7. Electric-conduit-enameling apparatus comprising a pick-up station, including a horizontal support on which the respective conduits rest with said conduits disposed horizontally with respect to one another, overhead supporting means extending above and along the length of a tank for enamel, a conveyor including a continuous chain that moves along the support, and including also hangers at spaced regions along the length of the chain and connected with the chain and extending downwardly below the chain, the support including means for tilting the hangers into horizontally extending positions, said means comprising guiding surfaces extending along the path of the conveyor and with progressively changing directions that shift the hangers into and then out of positions having a substantial component of horizontal extent, the hangers being of a length to reach to the conduits on said horizontal support when the hangers are in their horizontally extending positions to pick up the horizontally extending conduits successively as the conveyor moves past the pick-up station, the overhead support having a portion beyond the pick-up station leading upwardly with respect to the horizontal support to lift the conduits into vertical positions, and other guide means remote from the hangers in position to contact with the conduits to prevent them from swinging during the time that they are returning to their downwardly extending positions, a downwardly extending section of the overhead supporting means along which the continuous conveyor chain moves above a tank for immersing the conduits progressively deeper into the enamel in the tank, and another section of the overhead supporting means along which the conveyor chain travels upwardly while over the tank to raise the conduits from the tank before they reach the far end of said tank.

8. Apparatus for enameling the inside and outside surfaces of electric conduits, said apparatus comprising a tank for holding enamel which is to be applied to the conduits, an overhead track, a conveyor that moves along the overhead track, said conveyor comprising a plurality of successive carriage sections that are supported by and move along the track in spaced relation to one another, universal connections pivotally connected with successive carriage sections to hold said sections in spaced relation to one another and forming with said sections a continuous train, hangers pivotally connected with and extending downwardly from the carriage sections for holding the upper ends of the conduits, means for dipping the conduits into the enamel quickly and withdrawing them slowly, said means comprising a portion of the length of the track extending above and along the length of the tank and having a dip therein along which the carriage sections travel and along which the universal connections pivot to provide downward and upward movement of different sections of the conveyor, said track at the dip sloping first downwardly toward the tank and then upwardly away from the tank with the downward slope substantially steeper than the upward slope, and power driving mechanism that advances the conveyor along the track at a speed which is co-ordinated with the upward slope of the track and with the viscosity of the enamel in the tank to lift each conduit progressively higher in the enamel at the rate at which excess enamel runs down the surfaces of the conduit, the lowest level of the track above the tank being close enough to the intended liquid level in the tank to immerse each conduit as the successive hangers approach said lowest level and at least a portion of the tank extending under the upwardly sloping portion of the track at least as far as a location where the conduits are raised above the level of the enamel in the tank.

9. Apparatus for enameling conduits, including in combination, an overhead support, a conveyor that moves along said support, the conveyor comprising a plurality of successive carriage sections that move along the overhead supporting means in spaced relation to one another, connectors pivotally connected with successive carriage sections to hold said sections in spaced relation to one another and forming with said sections a continuous train, hangers connected with and extending downwardly from the carriage sections for holding the upper ends of conduits that are moved along a path, two tanks each of which is movable transversely into and out of the path traversed by the conduits, and each of which is substantially longer than it is wide and each of which has its long dimension extending lengthwise in the direction of travel of the hangers, tank supports on which the tanks are movable transversely of their length, connections between the tanks whereby movement of either tank into position directly under the path of the hangers automatically moves the other tank out of such position, the overhead support having a portion of its length above the tank extending downwardly to a low point at which a conduit carried by the hangers is immersed in the enamel in the tank, and having another part extending upwardly to a level that enables the successive lengths of conduit to clear the end of the tank as the conduits carried by the conveyor are lifted out of the tank.

References Cited in the file of this patent

UNITED STATES PATENTS

| 689,563 | Orcutt et al. | Dec. 24, 1901 |
| 856,996 | Custer et al. | June 11, 1907 |
| 890,250 | Thompson | June 9, 1908 |
| 1,010,720 | Broderick | Dec. 5, 1911 |
| 1,015,379 | Darting | Jan. 23, 1912 |
| 1,270,755 | Holmberg | June 25, 1918 |
| 1,277,617 | McBride | Sept. 3, 1918 |
| 1,951,400 | Dvorak | Mar. 20, 1934 |
| 1,976,448 | Lawler | Oct. 9, 1934 |
| 2,236,605 | Ozouf | Apr. 1, 1941 |
| 2,269,592 | McGraw | Jan. 13, 1942 |
| 2,381,502 | Lang | Aug. 7, 1945 |
| 2,465,128 | Starkey | Mar. 22, 1949 |
| 2,560,270 | Bird | July 10, 1951 |

FOREIGN PATENTS

| 257,493 | Switzerland | Oct. 15, 1938 |